Figure 1:
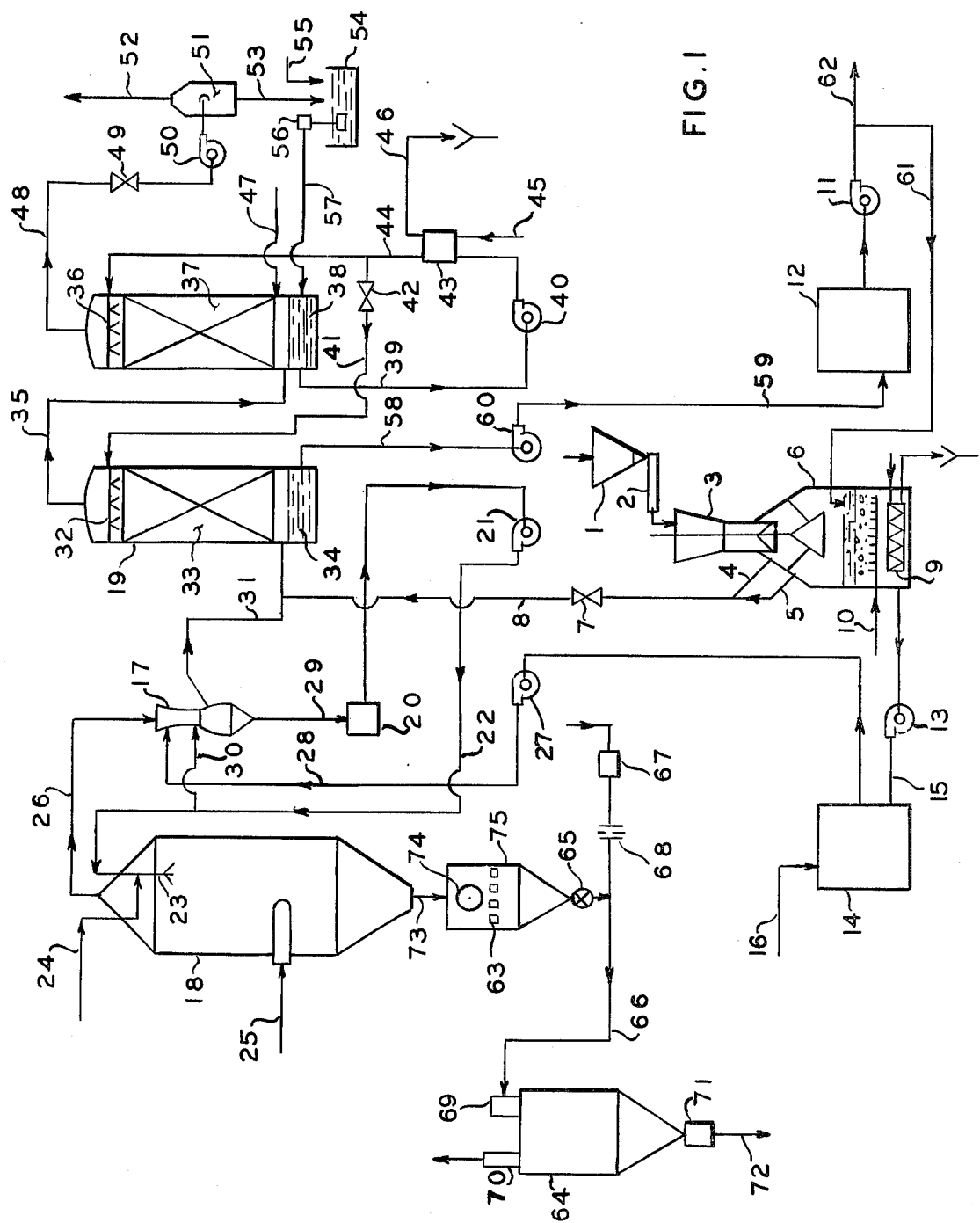

United States Patent [19]
Holley et al.

[11] 4,086,321
[45] Apr. 25, 1978

[54] PRODUCING PURE IRON OXIDES

[75] Inventors: Carl A. Holley, 2500 Baldwick Rd., Pittsburgh, Pa. 15205; Russell J. McKinnon, Pittsburgh, Pa.

[73] Assignee: Carl A. Holley, Pittsburgh, Pa.

[21] Appl. No.: 697,958

[22] Filed: Jun. 21, 1976

[51] Int. Cl.$^2$ .......................................... C01G 49/02
[52] U.S. Cl. ................... 423/150; 423/592; 423/633; 423/488; 423/DIG. 1; 134/3; 134/10; 23/262
[58] Field of Search ............ 423/150, 488, 493, 592, 423/633, 658.5, 604, 605, 606, 617, 618; 134/3, 10, 37

[56] References Cited

U.S. PATENT DOCUMENTS

| | | | |
|---|---|---|---|
| 2,155,119 | 4/1939 | Ebner | 423/633 |
| 3,351,427 | 11/1967 | Wendell | 423/633 |
| 3,399,964 | 9/1968 | Michels et al. | 423/DIG. 1 |
| 3,578,401 | 5/1971 | Uekerle | 423/DIG. 1 |
| 3,634,032 | 1/1972 | Segrove | 423/633 |
| 3,658,483 | 4/1972 | Lienau | 423/481 |
| 3,745,207 | 7/1973 | Hansen | 423/DIG. 1 |

FOREIGN PATENT DOCUMENTS

| | | | |
|---|---|---|---|
| 1,667,180 | 9/1971 | Germany | 423/633 |
| 2,261,083 | 7/1974 | Germany | 423/633 |

*Primary Examiner*—O. R. Vertiz
*Assistant Examiner*—Brian E. Hearn
*Attorney, Agent, or Firm*—William J. Ruano

[57] ABSTRACT

A method and apparatus for producing pre metallic oxides by dissolving the metal or oxide in heated dilute hydrochloric acid to form metallic chloride in a water solution (which solution may instead, be a waste product from a steel strip pickling line), reacting said solution in a reactor in the presence of heated oxygen to form metal oxide, part of which oxide being carried over in vapor form to a variable throat venturi where it is redissolved and reintroduced into the reactor to insure that only low chloride oxide will be discharged as a product. The system operates under negative pressure to prevent leakage tendency of HCl to the outside atmosphere.

25 Claims, 1 Drawing Figure

PRODUCING PURE IRON OXIDES

This invention relates to an improved process and apparatus for the production of metallic oxides by high temperature hydrolysis of aqueous metallic chloride solutions. The metal oxides are much in demand for pigments, powder metallurgy as well as hard and soft ferrite manufacture. The metallic oxides for these applications must be finer than 1 micron in size and contain no more than 0.2% chlorides.

The process is based on the fact that most metals and their oxides will dissolve in heated dilute hydrochloric acid forming a metallic chloride in a water solution. The metallic chloride can also be formed as a waste product from a metal pickling operation, such as in a steel strip pickling line.

In the past, as exemplified by Robinson U.S. Pat. No. 3,310,435, dated March 21, 1967, attempts have been made to provide a process for continuous pickling of steel with hydrochloric acid and treatment of the spent pickle liquor to recover the acid therefrom for economical re-use however, apparently no one has processed metal chlorides to obtain a high purity oxide. Moreover, such process has a number of disadvantages which have been overcome by the present invention. For example, such process requires, in the roaster, a burner with excess air in order to provide oxygen in the products of combustion, whereas in the present process, no burner is required and oxygen is supplied at the top of the roaster, through the spray nozzles, permitting the use of an external heating chamber and the use of an inert gas as the heating medium. Also, in the patented process, iron oxide is collected at the bottom of the cyclone, which oxide is high in chloride, therefore not saleable as a pure metal oxide as provided in the present invention. Moreover, in the present invention, as compared to that described in the above patent, incoming water to the roaster is reduced by about 25%, therefore, the necessary input of fuel is considerably reduced, which also reduces the necessary size of the roaster and other vessels.

In the abovementioned patented process, water from an outside source is introduced into the absorber, whereas in the present invention, recycling is effected in the scrubber whereby no outside source of water need be fed into the absorber, thereby making the water considerably purer than that introduced from an outside source and the oxide produced purer.

Likewise, the abovementioned process does not have apparatus for dissolving metal in hydrochloric acid, as in the present process, and since the present system operates under negative pressure, as compared to the pressure system shown in the previous patent, there is no leakage tendency of HCL to the outside atmosphere. The present process includes items (such as 75) and a pneumatic handling system, as well as other additional features not disclosed in the aforesaid patent which enable comminution of the particles to a much greater extent, such as of the order of 0.7 microns max. for iron oxide, which is a very saleable size when in the pure state.

The previous process collects carry over oxide in a mechanical collector, or separator such as a cyclone, which oxide contains as much as 3–4% chlorides and has very little sale value. In the present process, these carry over oxides are redissolved in the scrubber and reintroduced into the reaction vessel to insure that only low chloride oxide will be discharged as product.

The previous process has a gaseous discharge from vessel 31 which does not meet today's air pollution standards while the gaseous discharge from the present process contains nothing prohibited by air pollution standards.

Also the patented process is confined to the production of iron oxide whereas the present invention permits the production of a wide range of metal oxides by high temperature hydrolysis of aqueous metallic chloride solutions.

An object of the present invention, therefore, is to provide a novel apparatus and method which will overcome the disadvantages and short comings of the previous processes, such as that described in the abovementioned patent.

A broad object of the invention is to dissolve metals and their oxides in heated dilute hydrochloric acid forming a metal chloride in a water solution or as a waste product from a metal pickling operation, such as steel strip pickling.

Other objects and advantages will become more apparent from a study of the following description taken with the accompanying drawing wherein:

The single FIGURE is a schematic or flow diagram showing a novel process and apparatus for producing metallic oxides by high temperature hydrolysis of aqueous metallic chloride solutions embodying the present invention. For a better understanding of the invention, ferrous chloride will be the aqueous metallic chloride used to describe the process.

Referring more particularly to the drawing, iron oxide (FeO, mill scale) is put into a hopper 1, and fed at a controlled rate by feeder 2, into a batch hopper 3, which batch hopper 3 is of the same design as a double bell and hopper as used in a blast furnace in the steel industry, which permits the charging of mill scale into the dissolving tank 6 without the HCl vapors escaping to the atmosphere. Conduit 4 is used to vent the hydrogen chloride gas from the charge hopper back to the regeneration process via the adiabatic absorber 19. Conduit 5 is used to vent the dissolving tank 6. A control valve 7 in conduit 8 controls the vent of the dissolving tank. The dissolving tank is heated by an indirect heat exchanger 9 which for the purpose of this description, uses steam as the heating medium. The tank 6 is agitated by compressed air via conduit 10 to speed the reaction time. This can also be accomplished with direct steam sparging. A similar practice is used by the steel industry in the carbon steel strip pickling lines. Regenerated hydrochloric acid at 20% by weight is fed into the dissolving tank by pump 11 from acid storage tank 12. The iron oxide goes into solution by the following equation:

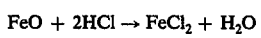

$$FeO + 2HCl \rightarrow FeCl_2 + H_2O$$

The metallic solution which consists of HCl, $FeCl_2$ and $H_2O$ is pumped by pump 13 via conduit 15 to the regeneration process. (It will be noted that there is free HCl in the solution because this assures all the iron is dissolved.) The metallic solution is pumped by pump 13 to an aqueous metal chloride storage tank 14. This storage tank is used to assure a continued and constant flow of solution to the regeneration part of the process. This tank 14 can also be used to accept metallic solution from an outside source, such as a carbon steel pickling line operation, via conduit 16.

The solution is pumped from storage tank 14 to the variable throat venturi scrubber 17. The venturi acts as a heat exchanger to extract heat from the hot off gas stream coming from the reaction chamber 18 by vaporizing some of the water and hydrogen chloride in the incoming metallic solution. The venturi also dissolves the iron oxide carry-over from the reaction chamber in accordance with the following equation:

$$Fe_2O_3 + 6HCl \rightarrow 2FeCl_3 + 3H_2O$$

The function of the venturi scrubber can also be accomplished by other means, such as a packed column similar to a wet scrubber.

The gas leaves the venturi scrubber and goes to the adiabatic absorber 19. The concentrated solution goes to collection tank 20 via conduit 29 and is pumped by pump 21 via conduit 22 to a system of bi-fluid nozzles 23 which use high pressure air or oxygen via conduit 24 to provide the required mixture for the following reactions to take place:

$$2FeCl_2 + 2H_2O + \tfrac{1}{2} O_2 \rightarrow Fe_2O_3 + 4HCl$$

$$2FeCl_3 + 3H_2O \rightarrow Fe_2O_3 + 6HCl$$

The thermal decomposition of ferrous and ferric chloride is accomplished by atomizing the concentrated metallic solution into small droplets, in the size of less than 50 microns in diameter, in the presence of oxygen and water vapor. The heat required to vaporize the water and thermally decompose the metal chloride can be provided either directly by introducing the products of combustion into the reaction chamber or roaster or indirectly by heating an inert gas, such as nitrogen, to a temperature of about 2500° F. and pass it into the vessel via refractory lined tubes 25. For the purpose of describing the design of the reaction chamber, the combustion gas generated by burning a gaseous or oil fuel will be used.

The physical properties of spray reacted metallic solutions are subject to considerable variations, depending on the direction of flow of the heated gas and its temperature, size of vessel and spray particle size. The flow patterns in the reaction chamber are complex with a high degree of turbulence. Therefore, the reaction vessel to be used for the process has countercurrent flow of the combustion gases and the heated gas will be injected tangentially at the base of reactor cylinder through refractory lined tubes 25 as to provide a spiral flow of gas up the vessel walls.

The vessel is preferably a vertical cylinder with internal refractory suitable for the temperature and process atmosphere. The bottom of the vessel is preferably conical and refractory lined so as to provide collection at the bottom of the vessel for the metal oxide generated in the process. The slope of the cone will depend on the physical characteristics of the oxide being processed. A suitable sized outlet for the metal oxide product will be provided in the center of the cone bottom for discharge via conduit 73. The top of the vessel is preferably conical with a gas duct in the center so as to minimize product oxide carry-over in the exit gases via conduit 26. The height of the sidewalls and diameter of the vessel will be designed to accomplish a minimum contact time of 5 seconds with each spray particle with the heated gas.

For economical reasons, the reaction chamber is made of steel and is lined on the outside with insulation. The inside refractory and outside insulation will be designed to maintain a minimum 600° F. temperature of the steel shell. This temperature is selected because the structural strength of the steel is not significantly affected by this temperature and the steel surface of the reaction chamber that is in contact with the process gases will be above the dew point of the hydrogen chloride gas. In this state, the acidic gas will not attack or corrode the steel shell. The reaction vessel is operated at a minimum of 2 inch water column vacuum. This provides that the process gases are not exiting to the atmosphere, causing air pollution. This condition can occur when the seal to the atmosphere is broken such as by removing a nozzle when the vessel is in operation.

The gases leaving the top of the reaction chamber are composed of water vapor, hydrogen chloride gas, products of combustion and metallic oxide carry-over and are pulled into the variable throat venturi scrubber 17 which is being flooded by the aqueous metallic chloride solution coming from pump 27 via conduit 28. As backup to remove and dissolve all the metallic oxide from the vessel exit gases, pump 21, via conduit 30, can supply additional concentrated solution. The gas and liquid solution are in intimate contact which allows the solution to absorb the sensible heat from the gas which raises the temperature of the concentrated solution. The increase in temperature is to between 180° to 190° F., depending on the amount of vacuum at the venturi scrubber, that is required to contain the carry-over metallic oxide.

The cooled gas exits the scrubber via conduit 31 and enters the bottom of the adiabatic absorption column 19. The gases enter the bottom of the absorber and are pulled through the packed bed 33. Sprays 32, at the top of the packing, distribute the water over the packing for absorbing the hydrogen chloride gas to form hydrochloric acid at about 20% by weight, the approximate azeotrope composition at that pressure, considering the partial pressure of water and HCl vapors.

The design of the absorber consists of a HCl acid collection sump 34 to provide a pumping tank for further transport:

The economics are affected in the material of construction selection for the absorber and the remaining equipment in the system because of the cooled gas going in the range of 200° F. going into column 19. Materials, such as fiberglass, rubber and plastics, may be used.

The products of combustion exiting the absorber are saturated with water vapor and a trace of hydrogen chloride gas flow into the bottom of packed bed scrubber through conduit 35. The gases are pulled through the packed bed 37 and sprays 36, at the top of the packing, distribute water over the packing for removing and carry-over of hydrogen chloride gas that had not been absorbed in the absorber.

The design of the scrubber consists of a water collection sump 38 in the bottom which provides the water used in the absorber to make 20% by weight, HCl acid. Water leaves the scrubber via conduit 39 and is recycled back to the sprays at the top of the scrubber by using pump 40. A bleed of water goes to the absorber through conduit 41 and the control valve 42 is used to regulate the amount of water required to make the 20% by weight acid.

Heat exchanger 43 in conduit 44 is used to cool the recycle water for the purpose of removing the water vapor from the saturated gas stream coming from the absorber. The water vapor condensed is equal to the amount of water which is bled to the absorber via conduit 41. The heat exchanger 43 is of the shell and tube type design for the purpose of description of the process, but any conventional type may be used. Service water entering conduit 45 flows through heat exchanger 43 and can be discharged to the sewer via conduit 46 without contaminating the service water with the process. The scrubber, heat exchanger, recycle and bleed system provide the water required to make 20% by weight acid in the process without any outside system water requirements. Conduit 47 can provide outside make-up water for emergency conditions. The saturated cooled gases leaving the scrubber via conduit 48 pass through a control valve 49 which is used to maintain the system vacuum at a constant pressure.

The process gas fan 50 provides the required system vacuum and discharges into a stack base 51 which is designed with a tangential gas inlet so that the gases exiting the system via stack 52 will flow up the exit stack wall giving the maximum contact of the gas to the stack wall. This will achieve maximum condensation of the water vapor in the exit gas. This condensate flows down to the bottom of the stack base and is bled by gravity via conduit 53 into a process collection sump 54. The process collection sump is used in the process to collect any acidic water which has been generated in the process (such as seal water used in the process pumps via conduit 55). A sump pump 56 is used to pump the acidic water back to the scrubber water collection sump via conduit 57.

The total system as described has no process liquid effluent leaving the process. This is a highly important feature in view of the present ecological demands for pollution control.

The 20% by weight acid exits the absorber collection sump 34 via conduit 58 and is pumped by pump 60 to acid storage tank 12 via conduit 59. The acid storage tank is used to provide HCl acid to the batch dissolve tank 6. Pump 11 pumps the acid via conduit 61 to the dissolving tank, or, it can pump acid via conduit 62 to another process, such as to a carbon steel strip pickling line in the steel industry, as disclosed in the aforesaid Robinson et al. patent, for use as product acid.

The metallic oxide which exits the reaction vessel 18 (burner) discharges into a seal hopper 75. This totally enclosed hopper provides a seal to the systems vacuum and is designed to have a head of metallic oxide greater than the negative head in the reaction vessel. The seal hopper has a stationary bar grizzley 63 above the oxide head of material to assure that any buildup of incomplete reacted metal chloride in lump form may not pass into the product oxide storage bin 64. The oxide hopper also incorporates a seal inspection door 74 above the stationary bar grizzley to remove any unreacted metal chloride lumps.

The metal oxide discharges into a rotary feeder 65 which feeds a pneumatic conveying system conduit 66. A blower 67 provides the necessary air at pressure to convey the oxide to oxide storage tank 64. An orifice 68 is placed between the blower and oxide feeder as to reduce the line pressure at the oxide feeder point of discharge. This will reduce the maintenance of the feeder by providing an equal vacuum on each side of the feeder.

Conduit 66 will convey the oxide under positive pressure to baffle chamber 69 at the top of the oxide storage bin. The baffle chamber and the pneumatic system is used in the process to disintegrate the product oxide into its smallest particle size. The oxide bin is used to store the product oxide and is designed with a cone-shaped bottom designed for the metallic oxide being processed.

The oxide bin is equipped with a dust collecting collector 70 which discharges the conveying air to the atmosphere and the product oxide back into the storage bin. A discharge valve 71 is provided at the discharge of the oxide bin to give complete shutoff when product oxide is not being loaded through conduit 72 for shipment.

Thus it will be seen that we have provided a highly efficient method and apparatus for producing metallic oxides by high temperature hydrolysis of aqueous metallic chloride solutions. Some of the advantages thereof may be summarized as follows:

An outstanding disadvantage of present processes, such as those used in steel pickling lines, is that they discharge or have run-offs of contaminated materials. The present invention overcomes this partially by spillage recycling involving putting a curb around the iron oxide and other process area and sloping the floor to a central sump area so that the floor can be washed down and the iron oxide redissolved and recycled back through the system.

In accordance with the present invention, we are going to take the water which is now being discharged from the bottom of the scrubber and recycle this to the top of the scrubber. In addition the water vapor in the stack gases are condensed, in the present invention by cooling the gas stream which will allow the process to operate with no water addition except that in the aqueous hydrochloric acid solution.

This will allow the system to operate without discharging any water (as liquid) from the system.

At present, the process air is added to the roaster along with the combustion air and the pickle liquor is added through single fluid spray nozzles at the top of the roaster. Using a single fluid nozzle requires pumps which will pump the 180° F. pickle liquor at a pressure of 150 p.s.i.g. This combination of pressure and temperature requires special high priced pumps which only last 3 or 4 months in operation. When the pump begins to wear, the output pressure is reduced and the droplet size is increased. This causes an increase in the iron oxide sphere and an increase in the chlorine carry-over to the oxide which reduces the quality of the oxide.

According to the present invention, we are using a bi-fluid nozzle in which both pickle liquor and 100 p.s.i.g. compressed air is added at the nozzle. The pressure of the pickle liquor pump discharge needs only to be approximately 50 p.s.i.g. which allows the use of lower cost pumps made of plastic. These pumps will cost much less and last for several years with very little maintenance.

By using the bi-fluid nozzle, the droplets coming from the spray nozzle is about ¼ the volume of the best droplet that can be obtained from a single fluid nozzle. By adding the reaction air at the nozzle and by having smaller droplets, the reaction between the iron and the oxygen takes place faster and is more complete. The smaller droplet size allows more of the chlorine to evaporate, therefore the chlorine carry-over in the iron oxide is less. The combination of smaller iron oxide spheres and lower chlorine makes the iron oxide a better product for the magnet and pigment industry.

While we have illustrated and described a single specific embodiment of our invention, it will be understood that this is by way of illustration only and that various changes and modifications may be contemplated in our invention and within the scope of the following claims.

We claim:

1. The method of producing pure, fine, iron oxide comprising, dissolving iron oxide in dilute hydrochloric acid to form an aqueous iron chloride solution while ventilating gases formed thereby, conducting said solution through a scrubber-heat exchanger, reacting said solution in a reactor by spraying the concentrated solution together with oxygen, at about 2500° F into the top portion of a sufficiently heated reaction chamber to form iron chloride droplets of less than 50 microns in diameter which, as they descend throughout the height of the reaction chamber, will decompose in the presence of the oxygen and water vapor to form iron oxide particles of the order of .7 micron size, which collect at the bottom of said reactor, and hydrogen chloride vapor together with remnant iron oxide and water vapor which are conducted to said scrubber-heat exchanger where the sensible heat of the gases is given up to the incoming iron chloride solution and the remnant iron oxide redissolved, and reintroducing said redissolved iron oxide into said reactor along with the new iron chloride solution.

2. The method recited in claim 1 wherein said scrubber-heat exchanger is a variable throat venturi scrubber.

3. The method recited in claim 1 wherein said reactor is heated indirectly and wherein said reactor is devoid of a fuel burner.

4. The method recited in claim 1 wherein said aqueous metallic chloride is the waste product from a steel strip pickling bath.

5. The method recited in claim 1 wherein said iron oxide is introduced into a dissolving tank through a double bell feed to prevent the escape of hydrogen chloride fumes.

6. The method recited in claim 5 wherein said dissolving tank is heated indirectly by heat exchangers and compressed air is used to agitate the aqueous hydrochloric acid solution.

7. The method recited in claim 5 wherein said dissolving tank is heated and agitated by direct steam sparging.

8. The method recited in claim 5 wherein said hydrogen chloride fumes are vented to and recovered in an adiabatic absorber.

9. The method recited in claim 1 wherein a part of said preheated solution from said scrubber-heat exchanger is recycled to the inlet of the scrubber together with the aqueous iron chloride from a dissolving tank to insure maximum efficiency for the scrubber-heat exchanger.

10. The method recited in claim 1 wherein the concentrated solution and hydrogen chloride and water vapor gas are separated and the concentrated solution collected in a collection tank.

11. The method recited in claim 10 wherein the hydrogen chloride and water vapor gas is introduced in the bottom of an adiabatic absorption column and pulled up through the packed bed onto which an aqueous solution is sprayed onto the bed from the top, which aqueous solution absorbs the hydrogen chloride gas to form an aqueous hydrochloric acid solution, at about 20% by weight hydrochloric acid, which is collected in a collection sump at the bottom of the column.

12. The method recited in claim 11 wherein the aqueous solution is pumped from said scrubber collection sump.

13. The method recited in claim 11 wherein the gases from the top of said adiabatic absorption column are further pulled up through a packed bed scrubber onto which is sprayed an aqueous solution which absorbs any remaining hydrogen chloride gas and then is collected in a scrubber collection sump at the bottom of the scrubber.

14. The method recited in claim 13 wherein the aqueous solution sprayed onto the top of the bed is cooled aqueous solution collected in said scrubber collection sump.

15. The method recited in claim 13 wherein the cooled liquid condenses the water vapor in the gas stream to produce the required water for the absorber to make 20% by weight HCl Acid.

16. The method recited in claim 1 wherein the concentrated solution is sprayed together with compressed air into said reaction chamber.

17. The method recited in claim 1 wherein said reactor is heated with combustion gases injected tangentially at the base of the reactor cylinder through refractory lined tubes.

18. The method recited in claim 14 wherein said combustion gases may be produced by combustion of either liquid or gaseous fuel.

19. The method recited in claim 1 wherein said iron oxide is collected in a conical bottom of said reaction chamber as a product.

20. The method recited in claim 19 wherein said iron oxide product is discharged into a seal hopper which is equipped with a stationary bar grizzly where incompletely reacted metal oxide conglomerates can be collected and removed.

21. The method recited in claim 20 wherein the iron oxide is discharged from the seal hopper through a rotary feeder into a pneumatic conveying system conduit into which has been inserted an orifice plate, so designed, to provide the same negative pressure on both sides of the rotary feeder.

22. The method recited in claim 21 wherein the iron oxide is discharged at high velocity from the pneumatic system into a baffle chamber at the top of the metallic oxide storage bin so as to disintegrate conglomerates of product particles into the smallest particle size.

23. The method recited in claim 1 wherein the entire gaseous system operates under negative pressure to prevent leakage of hydrogen chloride containing gases to the outside atmosphere.

24. A method as recited in claim 1 wherein the total plant liquid effluent is collected into a sump and recycled back into the process to assure a high efficiency of chloride recovery and no liquid effluent leaving the process which would cause pollution.

25. The method recited in claim 1 wherein said scrubber-heat exchanger is a packed bed scrubber.

* * * * *